United States Patent [19]

Skibowski

[11] 4,049,018
[45] Sept. 20, 1977

[54] SHUT-OFF AND REGULATOR DEVICE FOR CONTROLLABLE MECHANISMS INTENDED FOR INSTALLATION IN PIPELINES

[76] Inventor: Hubert Skibowski, Schimmelmannstieg 3, 2 Hamburg 70, Germany

[21] Appl. No.: 597,200

[22] Filed: July 18, 1975

Related U.S. Application Data

[63] Continuation of Ser. No. 451,746, March 18, 1974, abandoned.

[30] Foreign Application Priority Data

Mar. 24, 1973 Germany .............................. 2314702
Apr. 11, 1973 Germany .............................. 2318165
Apr. 4, 1973 Germany .............................. 2316681

[51] Int. Cl.² .............................................. F16K 3/26
[52] U.S. Cl. ................................. 137/561 R; 137/268; 251/145; 251/344
[58] Field of Search .............. 137/488, 315, 268, 608, 137/610, 561 R; 251/344, 343, 145; 15/104.06 A, 3.5

[56] References Cited

U.S. PATENT DOCUMENTS

| 2,676,611 | 4/1954 | Page ..................................... 137/461 |
| 3,045,759 | 7/1962 | Garrett et al. .................... 137/155 X |
| 3,094,306 | 6/1963 | Conrad ............................. 251/344 X |
| 3,340,889 | 9/1967 | Petzold ................................ 137/268 |
| 3,557,822 | 1/1971 | Chronister ........................... 137/315 |
| 3,587,641 | 6/1971 | Johnson .......................... 251/344 X |

Primary Examiner—Alan Cohan
Assistant Examiner—Gerald A. Michalsky
Attorney, Agent, or Firm—Beaman & Beaman

[57] ABSTRACT

A shut-off and regulator device for controllable mechanisms intended for installation in pipelines, comprising a shut-off and regulating element movable between a closed position for engagement with a sealing seat and for inhibiting the flow of a pressurized fluid medium, and an open position, under the control of the pressurized medium, the shut-off and regulating element comprising a tubular spool sleeve which is adapted to be sealed in relation to a guide parallel to the pipeline when the device is installed and to move in relation thereto, and the sealing seat comprising an annular sealing face on a seat element fixed inside the spool sleeve, the seat element containing at least one passage, which in the open position, forms a through passage in association with at least one passage contained in the spool sleeve.

4 Claims, 9 Drawing Figures

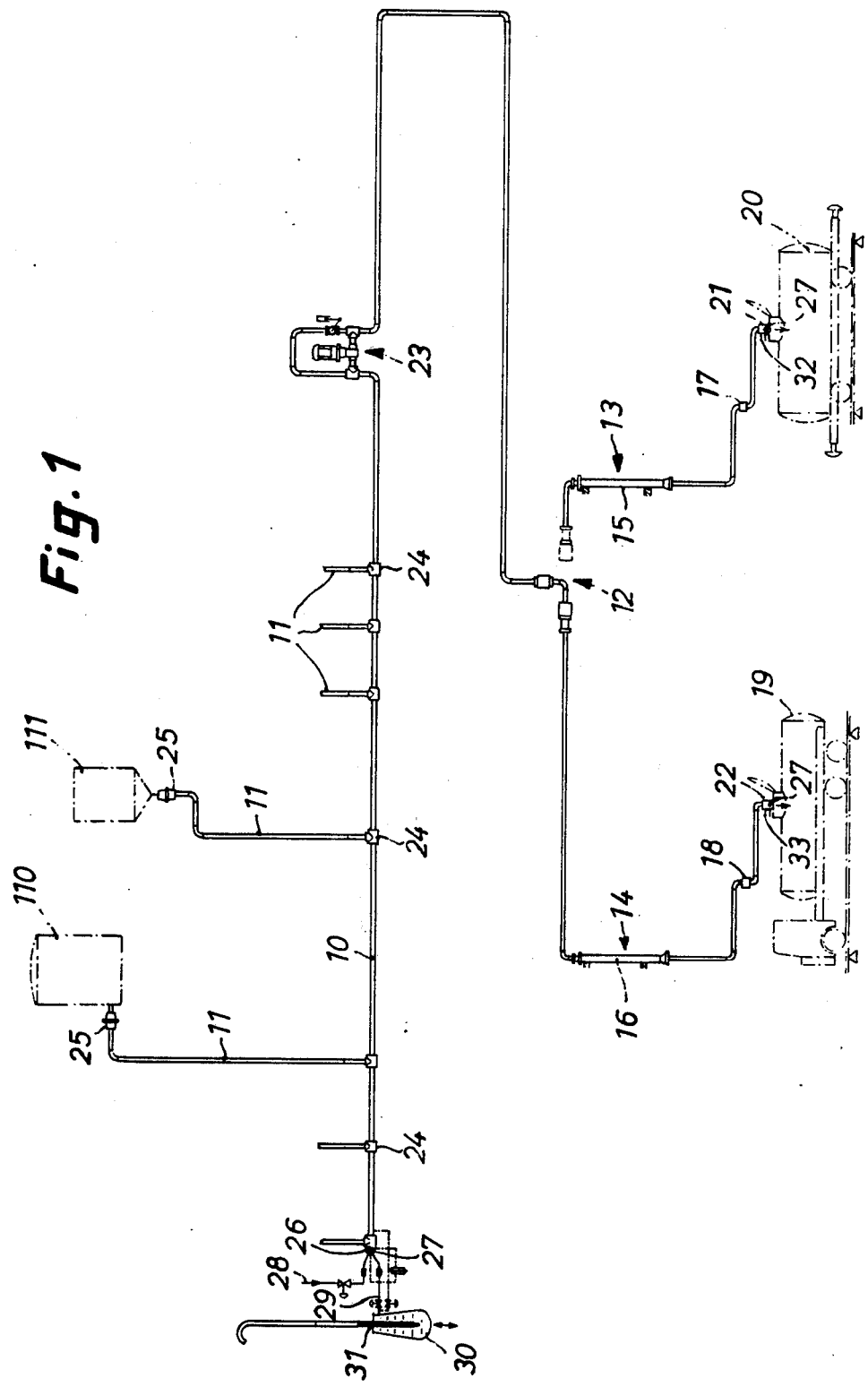

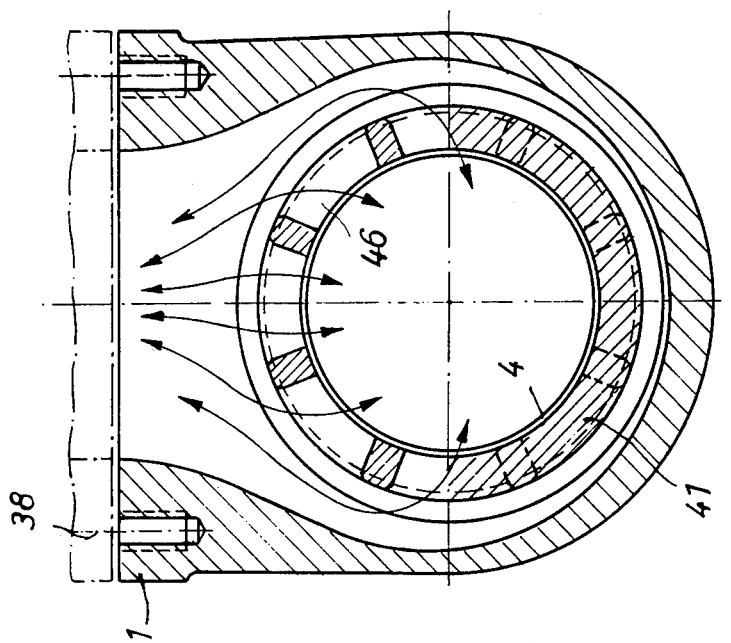
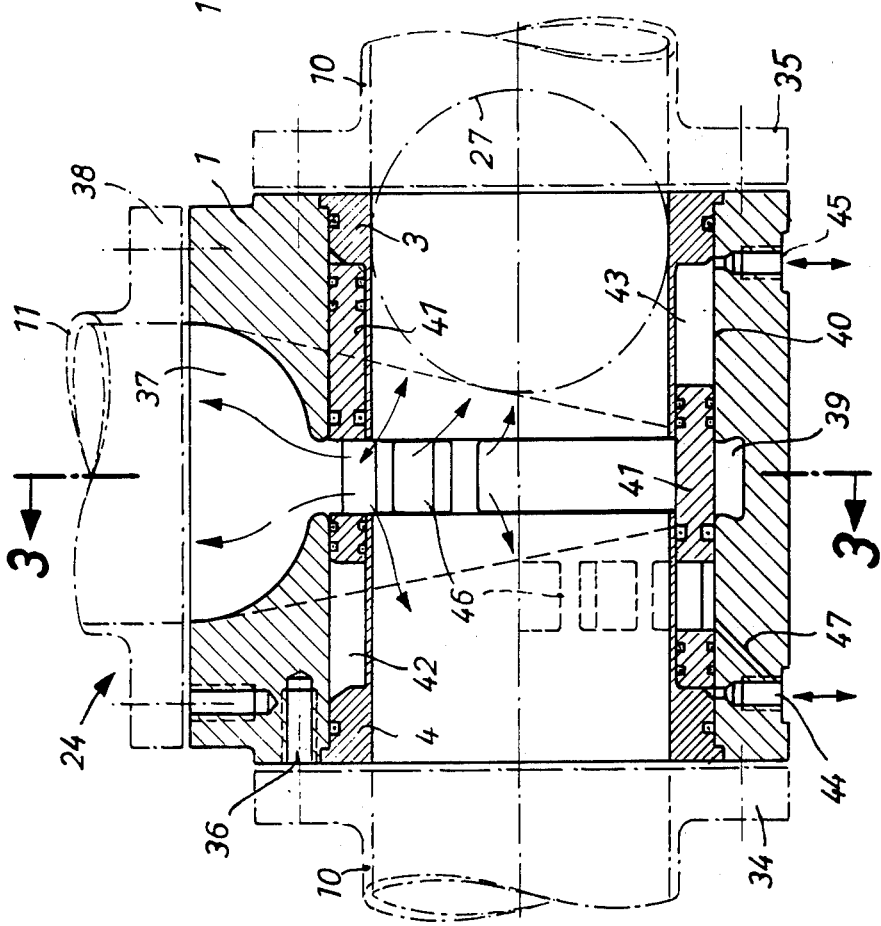

SHUT-OFF AND REGULATOR DEVICE FOR CONTROLLABLE MECHANISMS INTENDED FOR INSTALLATION IN PIPELINES

This is a continuation of application Ser. No. 451,746 filed Mar. 18, 1974, now abandoned.

BACKGROUND OF THE INVENTION

This invention relates to a shut-off and regulator device for controllable mechanisms intended for installation in pipelines.

Mutually compatible products of related kinds, such as oils, are pumped through a single pipeline for reasons of cost economy and reduction in space occupied. In order, in such instances, to prevent partial mixing between products when the products are changed, it is the usual procedure to evacuate the product already contained in the pipeline by means of a spherical, sleeve or cylinder scraper of elastic material scraping the internal wall of the pipe and effecting a seal there, which scraper, or as it is sometimes known a "go-devil", is subjected at one side to the influence of another pressurised medium (generally air) and is therefore displaced. The pipeline will lead, for example, from a storage dump comprising numerous vessels or tanks which are connected through tie-in pipes (product input) with the pipeline, to a distant tanktruck, ship-loading, process or mixing installation. To control the operation, a series of mechanisms are required, for example shut-off spools in the pipeline branches, a shut-off mechanism in the neighbourhood of the pipe tie-in points and filler mechanisms at the end of the pipeline in order to discharge a predetermined quantity of the product into the waiting tank, vessel or the like.

As far as tie-ins to pipelines which have a scraper facility are concerned, it is known to employ pipe connections to which the conventional mechanisms are attached by a flange or sleeve attachment. The entry cross sectional area is in this context annular or half-annular, with a minimum width, in order to prevent the scraper from jamming. Also known is a shut-off mechanism for a T-section pipeline branch, in the form of a manually-operated elbow valve whose core plug (which is always a nominal size smaller than the scraper line) extends up to the pipeline having the scraper facility and has a radius matching the internal radius of the pipe.

These known mechanisms to some extent suffer from major drawbacks. When running the scraper through these pipelines, residues are left behind at the cavities of the tie-in connections and mechanisms, which the scraper can not get at. These residues, left behind with each scraping operation, affect the quality of the product being pumped through the pipeline. For this reason, in practice very often the scraper method is discarded and each product is pumped through a separate line.

Commercially available valves, spools or gates, and other shut-off and regulating mechanisms, normally have no facility by which to avoid or indicate product mixing which has occurred as a consequence of defective seals. Accordingly, damage can be caused if, as a consequence of seals having become detached or defective, fractions of a product penetrate unperceived into one of the often numerous tie-in lines. To avoid this risk, very often two commercially available valves are connected in-line and in particular an itermediate section expanded across a third, smaller monitoring mechanism. However, in particular where remote-control is concerned, this measure turns out to be extremely expensive. Also, it occupies a large amount of space.

In the case of a mechanism which takes the form of a converted elbow valve, unfavourable flow characteristics are encountered because the nominal entry size must necessarily, for design reasons, be smaller than the nominal size of the pipeline for which the scraper is used. Because of the angled arrangement, this known kind of mechanism is very bulky. For remote-control, large and expensive diaphragm-type or piston-type drive arrangements are required. Moreover, the known mechanisms are not pressure-relieved and this means that corresponding spring arrangements have to be fitted in order to develop an opposing force. Where a pneumatic control is used, therefore, the air consumption is correspondingly high. A further drawback resides in the danger to the O-rings which are used as seals, more particularly in fact in the open position. The seals may be torn out by severe turbulence.

To shut off and regulate pipelines carrying liquid and/or gaseous products, already a whole range of mechanisms are known, a number in the form of standard designs. The conventional regulating and shut-off mechanisms of manually and remote-controlled kinds are relatively bulky. They normally employ glands or gaiters. The seats of these mechanisms are not pressure-relieved so that they are extremely susceptible to wear. This applies in particular to mechanisms designed to pass scrapers.

Again, in the case of mechanisms used in filling applications, there is a whole range of known designs all of which have the drawback that the scraper can not be operated right up to the exit and frequently, too, remote-control is not possible.

SUMMARY OF THE INVENTION

The aim of the invention is to provide for the above indicated and for other applicatons, a controllable mechanism for installation in pipelines which exhibits low wear, is simple to operate, can be remote-controlled, and has favourable properties from the point of view of scraping operations.

This aim of the invention is achieved in that the shut-off and regulating element is a tubular spool sleeve which is sealed in relation to a guide parallel to the pipeline and can move in relation thereto; and in that the sealed seat is constituted by an annular sealing face on a seat element fixed inside the spool sleeve, that seat element containing at least one passage, which, in the open position, forms a through passage in association with at least one passage contained in the spool sleeve.

The mechanism in accordance wih the invention can be used in a whole range of applications and has many advantages. It is readily amenable for use with a scraper and for example when used in a Teed pipeline branch, can be scraped without leaving any residues behind. Because the spool sleeve acting as the shut-off element, when operated by a pressurised mdium is not loaded by the pressure in the pipeline, the mechanism in accordance with the invention exhibits very little susceptibility to wear. Moreover, it enables extremely simple and reliable direct and remote-control to be effected. Furthermore, the mechanism in accordance with the invention has no glands and has small overall dimensions. The maximum diameter is no greater than the flange diameter of the particular pipelines. The installed length correspond to those of the shortest ball cocks. Taking a nominal size of 100 mm, the external diameter of the flange is 174 mm and the overall length 190 mm. Finally, the mechanism in accordance with the invention is light and can easily be dismantled and assembled.

In association with a pipeline T branch, one embodiment of the invention is characterised in that the spool sleeve has at least one lateral opening and is displaceable in a housing in the course of the straight, scrapable passage which latter is formed by a bush acting as a seat element, said bush likewise having at least one passage directed towards the lateral branch. In this embodiment, the sealing seat will preferentially be formed by two bushes of relatively small wall thickness whose internal diameters correspond to the diameter of the pipeline. The bushes are spaced apart from one another and through the gap the fluid medium can flow from the pipeline into the branch and vice versa, if the lateral opening in the spool sleeve is at an interval from the zone occupied by the bushes. This is the case when the spool is in the open position. The guide will advantageously be constituted by a housing within whose bore the spool sleeve is displaceably and sealingly assembled.

The operation of the spool sleeve will be conveniently brought about by applying the pressurised medium to either end of the sleeve as required.

In a further embodiment of the invention, it is arranged that the housing has a lateral bore opening into the guide bore, said lateral bore communicating with the lateral opening in the spool sleeve when the latter is in the closed position. The other end of said bore will lead for example into the control air space where the product is atmised when switching takes place and produces a vapour feather which is visible from a substantial distance. In this fashion, a visual check is obtained of seal wear.

The embodiment described in detail hereinbefore, is suitable in particular as a mechanism with a T branch which can be shut off, a mechanism in fact which can be scraped without any fear of leaving residues behind in pipe connections and valve housing. However, for many applications it is desirable to be able to effect controlled shut-off of a straight line. In this instance, a further embodiment of the invention provides that the annular sealing face is formed on an element disposed transversely of the pipeline axis, which element is connected through at least one web to a sealing sleeve extending to either side of the element and fixed in the housing coaxially to the pipeline, on which sleeve the spool sleeve can slide in sealing engagement; and that the spool sleeve is provided internally with a recess which, when the spool sleeve is in the open position, forms a passage for the pipeline. This kind of shut-off and regulating mechanism again possesses considerable advantages. The spool sleeve is pressure-relieved in this case too. The shut-off mechanism can pass fluid in both directions. Also, it is readily amenable to scraping up to the centre in each case. Again, it has small overall dimensions, can be quickly and easily assembled, can be manufactured straightforwardly without any very great expense and can be quickly converted to all kinds of control systems, using the modular principle. The wear is small and the amount of spare parts stock which needs to be held is small also.

Shut-off mechanisms are frequently also used in filling applications involving liquid and pasty media. In this context, another embodiment of the invention provides that the annular sealing face is formed on an element disposed transversely of the pipeline axis, which element is connected through at least one web with a sealing sleeve fixed in the housing coaxially to the pipeline, and on which the spool sleeve is slideably guided in sealing engagement; and in that the housing contains a bore coaxial with the pipeline axis in which the exterior of the spool sleeve slides in sealing engagement; and in that the bore wall exhibits a recess in the neighbourhood of the transverse element, which recess forms a passage when the spool sleeve is in the open position. The recess in the housing will preferentially take the form of an annular groove.

In this embodiment, too, the spool sleeve is pressure-relieved and just as in the embodiment described earlier, can be placed in intermediate positions in order to produce appropriate metering. Furthermore, it is readily amenable to use with a scaper, has no glands, is particularly suitable for filling operations carried out below the liquid level, can rapidly and easily be dismantled and assembled, and can be manufactured for an extremely low outlay.

Finally, the mechanism in accordance with the invention is extremely robust and exhibits low wear. During filling operations, the scraper is contained in a receiving and dispatch arrangement from which it can be dispatched through the desired pipeline inclusive of the mechanisms which the latter contains, up to a terminal point. From said terminal point, for example a filling mechanism, after the line has been cleaned the scraper is forced back to the receiving and dispatch arrangement so that another product can be pumped and filled.

The receiving and dispatch arrangement normally has a so-called scraper chamber, in which the scraper remains during the filling phase of operations. In order to determine the instant at which, after the filling line has been scraped, another product can be pumped through the line, it is desirable to know whether the scraper is in the chamber or not. To this end, it is known to arrange for an indicator pin to project into the chamber, which pin is forced out by the high-speed arrival of the scraper in the chamber, thus indicating to an operator that the scraping operation has been completed.

This kind of reception indication vis a vis the scraper, however, has the drawback that it can easily give rise to damage to the scraper because the latter enters the chamber with a considerable amount of energy and strikes the indicator pin.

In accordance with a further embodiment of the invention, it is arranged that the scraper chamber has approximately the same cross section as the filling line, and that a differential pressure guage is provided which measures the pressure drop across the scraper resting in the chamber.

The receiving and dispatch arrangement in accordance with the invention operates in the following manner. A differential pressure guage is connected to a front and a rear point in the scraper chamber. When the scraper is being forced back in the direction of the chamber, the displaced air is vented through an appropriate vent orifice in the chamber. No measureable differential pressure develops at the points of measurement. When, however, the scraper enters the chamber, it acts as a seal as far as communication between the measurement points is concerned, so that now the forward masurement point experiences the pressure of the pressurised medium, whilst the other measurement point is approximately at atmospheric pressure. This pressure drop determined by the differential pressure gauge, can be read off or otherwise processed to provide an indication concerning the arrival of the scraper in the receiving and dispatch arrangement.

The outlay involved by the receiving and dispatch arrangment in accordance with the invention is extremely small. Conventional scraper chambers can be used and all that is needed is to provide two further openings for the connection of a differential pressure measuring device. The additional outlay involved by the invention, therefore consists primarily of the differential pressure measuring device which may be a commercially available device, of no particularly high accuracy. This secures the advantage that reliable indication of the reception of the scraper is effected without the latter suffering any wear as a consequence.

In many cases, it is desireable to connect a single filling line capable of being utilised in conjunction with a scraper, arbitrarily to two or more mechanisms at different locations. One embodiment of the invention provides that a distributor pipe section is connected to the filling line and is moveably assembled in relation thereto; in that the free end of the distributor pipe section corresponds in terms of external and internal diameters to the free ends of the filling pipe line sections which are connected to the individual filling mechanisms; and in that around the outer circumference of the distributor pipe sections a spool sleeve is slideably assembled, which in the extended position projects beyond the end of the distributor pipe sections and can be brought into sealing engagement with the external circumference of a free end of a filling pipeline section aligned with the distributor pipe section.

This provides a device by means of which a single filling line, capable of operation in conjunction with a scraper, can be arbitrarily connected to any one of a series of filling mechanisms. The scraper characteristics of the filling line are not impaired by the presence of the distributor device in accordance with the invention.

In the device in accordance with the invention, the filling line, for example the end thereof, is associated with a distributor pipe section movable in relation to it, which distributor pipe section can arbitrarily be aligned with the free ends of pipeline sections whose other ends are fitted with a filling mechanism. To establish a continuous, frictionless and pressuretight connection between the distributor pipe section and the particular pipeline section, a spool sleeve is provided which slideably surrounds the distributor pipe section. It can be moved between a release position in which the distributor pipe section moves and can be aligned with a filling pipe section, and a filling position in which it is in sealing engagement with the free end of the filling pipe section.

The displacement of the spool sleeve can be produced in any required manner. It has been found particularly advantageous, and particularly where automatic operation is concerned, if, in accordance with the invention, the spool sleeve is designed as a piston which can be exposed to a pressurised medium at both ends and is slideably and sealingly guided in an annular cylinder space surrounding the distributor pipe section. The spool sleeve and piston can either be a one-piece item, in which case a shoulder is formed on the spool sleeve, the end faces of which form the piston areas, or may be composed of several individual components.

In order that the distributor pipe section can be connected to a desired filling pipeline section, the former must be movable in relation to the filling line. This can be achieved in a variety of ways. In accordance with a preferred embodiment of the invention, it is arranged that the distributor pipe section is curved, that the other end of the distributor pipe section is designed to displace telescopically in relation to the filling line, and that the free ends of the filling pipe sections are disposed in a plane located parallel to the plane in which the free end of the distributor pipe section moves. The telescopic arrangement can be contrived in any desired fashion although it must be ensured that this part of the system, too, is amenable to co-operation with the scraper.

The telescopic adjustment of the distributor pipe section can be produced either manually or mechanically, e.g. through a suitable servo drive system. It is particularly advantageous, if, in accordance with the invention, the end of the distributor pipe section is designed as a piston and slides in a cylinder space formed by an internal, preferably thin-walled sleeve, and an external sleeve, both of which are attached to the end of the filling line. This kind of piston can be supplied at both ends with a controlling pressurised medium in order to ensure a desired displacement of the distributor pipe section.

Instead of the telescopic connection, advantageously a knuckle joint connection can be used. The ends of the filling pipeline sections are then arranged in a circle about an axis which coincides with the axis of rotation of the distributor pipe section. Using an arrangement of this kind, a filling line can arbitrarily be connected to a wide range of filling mchanisms. This number can be still further increased by combining a telescopic connection with a knuckle joint connection so that the free ends of the filling pipeline sections can be disposed in several parallel circular planes.

This kind of distributor device can advantageously be usd for filling installations of the most varied kinds. In particular, it ca be adapted without great outlay to the particular prevailing conditions. Furthermore, it can be controlled automatically and this substantially reduces the outlay required in manning a filling installation.

BRIEF DESCRIPTION ON THE DRAWINGS

The invention will now be further described, by way of example, with reference to the accompanying drawings, in which:

FIG. 1 schematically illustrates a filling installation;

FIG. 2 illustrates a section through a shut-off mechanism, operated by a pressurised medium, for a pipeline T branch, one half of the figure showing the closed condition and the other the open condition;

FIG. 3 illustrates a section through the arrangement of FIG. 2, on the line 3 — 3;

Figure 7:
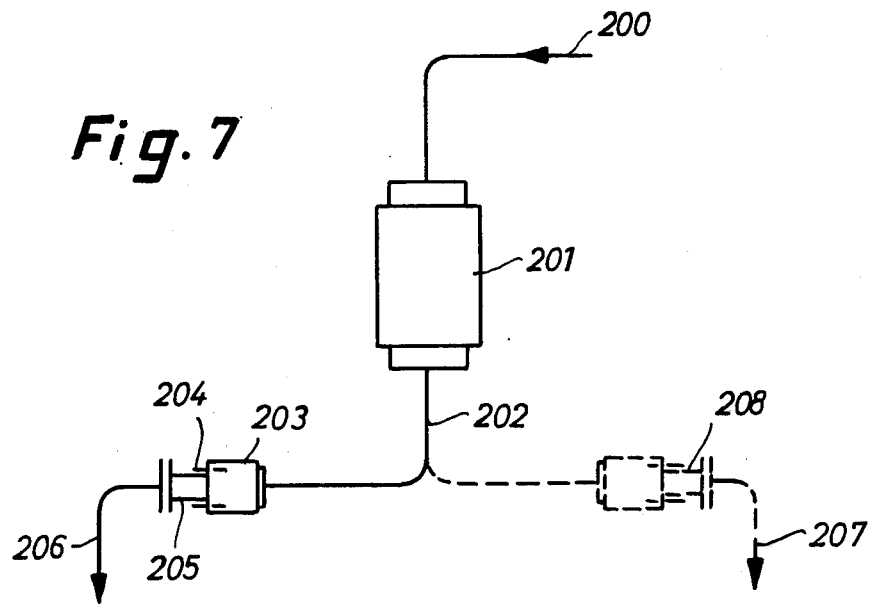
Figure 8:
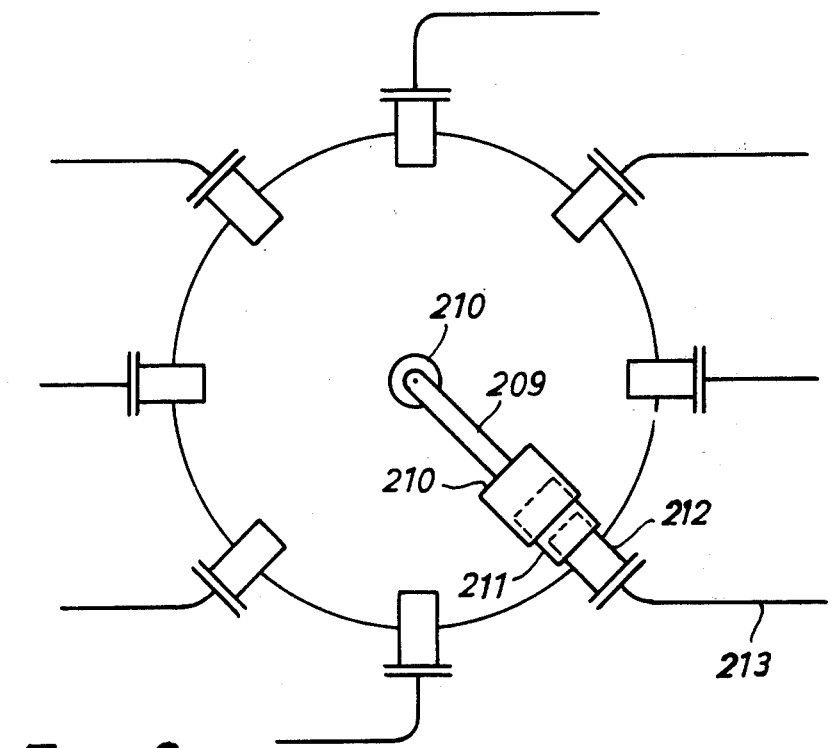
Figure 9:
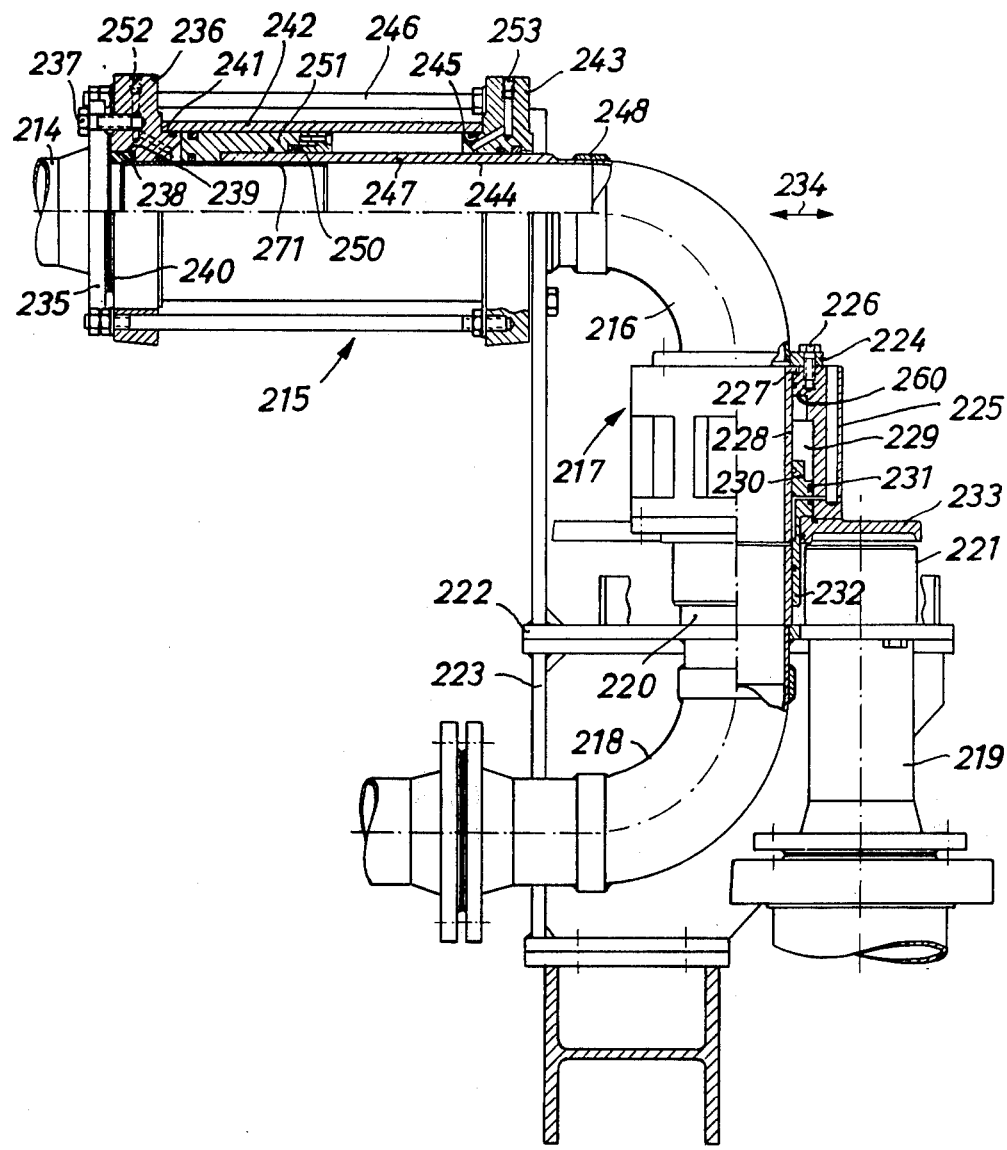

FIG. 7 schematically illustrates the distributor device in accordance with the invention, for two filling mechanisms;

FIG. 8 schematically illustrates the distributor device in accordance with the invention, for eight filling mechanisms;

FIG. 9 illustrates a section through a distributor device in accordance with the invention, for two filling mechanisms with a telescopic facility;

DESCRIPTION OF PREFERRED EMBODIMENTS

FIG. 1 illustrates a filling line 10 with a series of T branches. The branch lines 11 lead to vessels or tanks 110, 111 or the like, in a storage installation, which vessels or tanks are filled with mutually compatible products of related kinds, for example oils. Filling line 10 leads through a distributor device 12 to two filling installations 13, 14 which will be described in more detail at a later point. It should suffice at this point to mention that the installations 13, 14 are telescopically adjustable in the vertical sense, at 15, 16, and exhibit a knuckle joint at 17 and 18. Beneath the installation 14 there is a road tanker 19. Beneath the installation 15 there is a railway tank wagon 20. At the end of the line in the installations 13, 14 in each case there is a filling mechanism 21 and 22 respectively, whose design will be described in more detail at a later point. The line 10 also contains a pump arrangement 23 which will not be described in any further detail here.

The individual branch lines 11 are connected through mechanisms 24 which can be shut off, to the filling line 10. In the individual branch lines 11, spools 25 are arranged, although in FIG. 2 only two have been shown. Further detailed discussion of the mechanisms 24 and the spools 25 will be made later.

At the commencement of the line 10, there is a scraper chamber 26 containing a ball scraper 27. Connected to the scraper chamber 26 is a compressed air line 28 which can be connected to a compressed air source that has not been shown. Also connectable to the scraper chamber 26 is an exhaust line 29 which communicates at the other end with an expansion vessel 30 within which in turn there is located a droplet separator 31. The ball scraper 27 can be driven through the line 10 by means of compressed air supplied through the line 28, and can pass through the distributor device 12 into either the filling installation 13 or 14 and on to the corresponding filling mechanism 21 or 22 as the case may be. There, the scraper 27 has been illustrated in the other terminal position. The filling mechanisms 21 and 22 are furthermore provided with connections 32, 33 throgh which the compressed air or controlled air can be introduced into the scraper chamber 26 in order to activate the filling mechanism or to return the ball scraper 27. The principle of a filling line which can be scraped, constitutes part of the prior art and no further discussion will therefore be made here. A scraper chamber will be described in more detail later on.

In the following, individual mechanisms 21, 22, 24 and 25 are described in more detail.

The interrupted filling line 10 possesses flanges 34, 35 between which a housing 1 of a shut-off mechanism is arranged and attached. Attachment is effected by means of screws only one of which has been shown at 36. The housing 1 has a recess 37 of spherical cap shape opposite which, by means of a flange 38, the branch line 11 is attached to the housing 1. The recess 37 opens into an annular groove 39 whichis formed in the wall of a bore 40 extending to the housing 1. In the bore 40, bushes 3, 4 are inserted whose internal diameters correspond to that of the line 10. The bushes 3, 4 at their mutually facing ends which are spaced apart from one another, have a section of reduced diameter with which, along with the housing bore 40 and a spool sleeve 41, two control chambers 42, 43 are defined. The bushes 3, 4 are fixed in the bore 40 and are sealed by means of seals which have not been shown. The spool sleeve is likewise provided with seals which have not been shown, so that the control chambers 42, 43 are sealed off in pressuretight fashion. As can be seen, the spool sleeve 41 is mounted for axial displacement, its motion being limited by the lateral stops constituted by the buses 3, 4.

Through bores 44, 45 in the housing 1, the control chambers 42, 43 can be connected with a controlling pressurised medium, in order to displace the spool sleeve 41 between the stops. One terminal position (open position) has been shown in the upper half of the drawing while the other has been shown in the bottom half. The spool sleeve 41 is provided at its circumference with a series of openings corresponding in length substantially to the interval between the bushes 3 and 4 and having widths approximately equal to the annular groove 39. In the open position, the openings 46 are disposed in the zone of the interval between the bushes 3 and 4 and aligned with the annular groove 39 so the fluid medium from the line 11 can flow into the line 10, and vice versa.

In the closed position (bottom half of the drawing) the connection between the lines 10 and 11 is interrupted. In this position, however, a monitoring bore 47 is connected with one of the openings 46 thus providing facility for the detection of any leak which might have occurred due to seal damage.

The spool sleeve 41 can also, by the application of suitable control, be arrested in an intermediate position between the terminal positions, in order to achieve a desired degree of throttling between the lines 10 and 11.

As will be understood, the mechanism shown in FIG. 2 can be scraped by means of the ball scraper 27, without leaving any residue behind. The ball scraper 27 has been shown in broken line in FIG. 2.

Fig. 3 illustrates a section through the arrangement of FIG. 2 on the line 3—3, arrows indicating the path taken bya fluid medium, in the same way as in FIG. 2.

Figure 4:
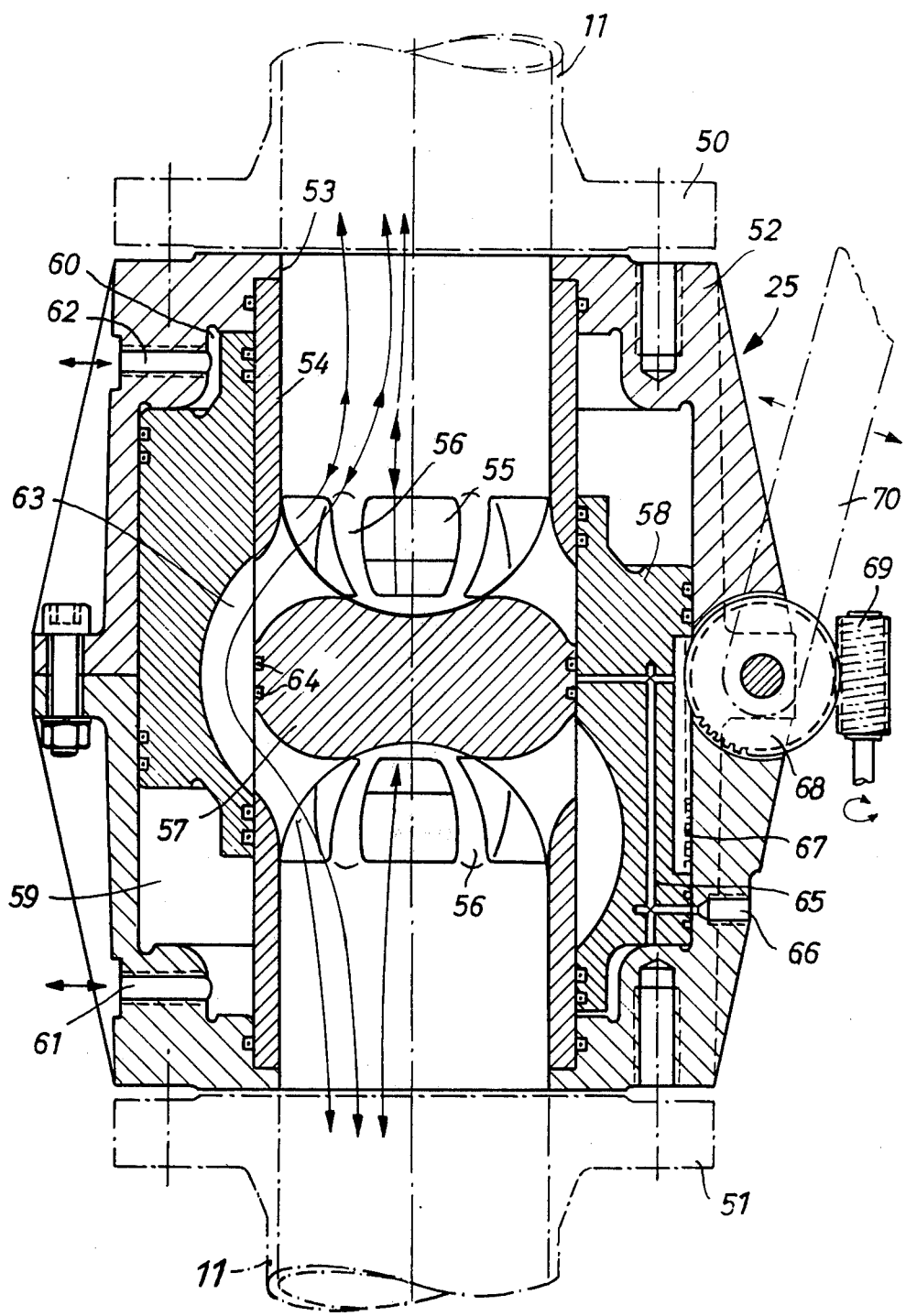
FIG. 4 illustrates a section through a shut-off mechanism, one half of the illustration showing the closed condition and the other the open condition.

FIG. 4 illustrates a spool for the branch lines 11. By means of flanges 50, 51, once again a housing 52 is arranged in the course of the line 11 and attached there. The housing 52 has a through bore 53 consisting of several sections of different diameters, and coaxial with the line pipe 11. Into said through bore 53 of the housing 52 which consists of two halves assembled together by screws, a bush 54 is inserted provided centrally with a series of openings 55 forming webs 56 between them which hold a transverse element 27. The webs 56 merge into the transverse element 27 so that they form a depression of spherical cap form whose radius corresponds to that of the bush 54.

The through bore 53 in the housing has a central section of larger diameter in which a spool sleeve 58 is arranged. With the help of seals which have not been shown, the spool sleeve is sealed vis a vis the housing 52 and the bush 54. It forms in association with the housing 52 and the bush 54, two control chambers 59, 60. The spool sleeve 58 can be moved backwards and forwards between two terminal positions one of which has been shown at the left-hand half of FIG. 4 (open position) and the other (closed position) in the right-hand half. Through bores 61, 62 the control chambers 59, 60 can be connected to a control pressure source in order to operate the spool sleeve 58. The spool sleeve 58 is furthermore provided internally with an annular groove 63 communicating in the open position with openings 55 in the bush 54 so the fluid medium can flow unimpeded through the line 11. This flow is prevented in the closed position (right-hand half of FIG. 4) by the sealing engagement established between the transverse element 57 and the spool sleeve 58. To this end, the transverse element 57 is equipped with two ring seals 64.

The spool sleeve 58 contains a system of bores 65 opening, at the internal end of the sleeve and when the latter is in its closed position, at a point between the two seals 64 into the bore of the sleeve 58, and communicating at the other end with another bore 66 in the housing 52. Through this monitoring bore 66 it is possible to determine if the ring seals 64 are leaking for one reason or another.

At the exterior, the spool sleeve 58 exhibits toothing 67 with which there meshes a gear 68 rotatably mounted in the housing 52. The gear 68 extends partially out of the housing 52 and in turn meshes with a worm wheel 69 which can be driven manually or by some guide system or other. A lever 70 is shown in broken line, which is secured to the gear 68 for rotation therewith. As will be readily apparent, the position of the gear 68 depends upon the position of the spool sleeve 58. In this fashion, the position of the spool sleeve can quite simply be transmitted to the exterior and indicated there. On the other hand, through the lever 70 or the worm wheel 69, the spool sleeve 58 can itself be displaced.

As will be immediately clear, the mechanism shown in FIG. 4 can readily be scraped right up to the centre. The design of the bush 54 in the neighbourhood of the transverse element 57 ensures that the ball scraper is received in such a fashion that no wear is caused. The returning of the ball scraper is effected by the appropriate introduction of a pressurised medium at the corresponding side of the transverse element 57.

Figure 5:
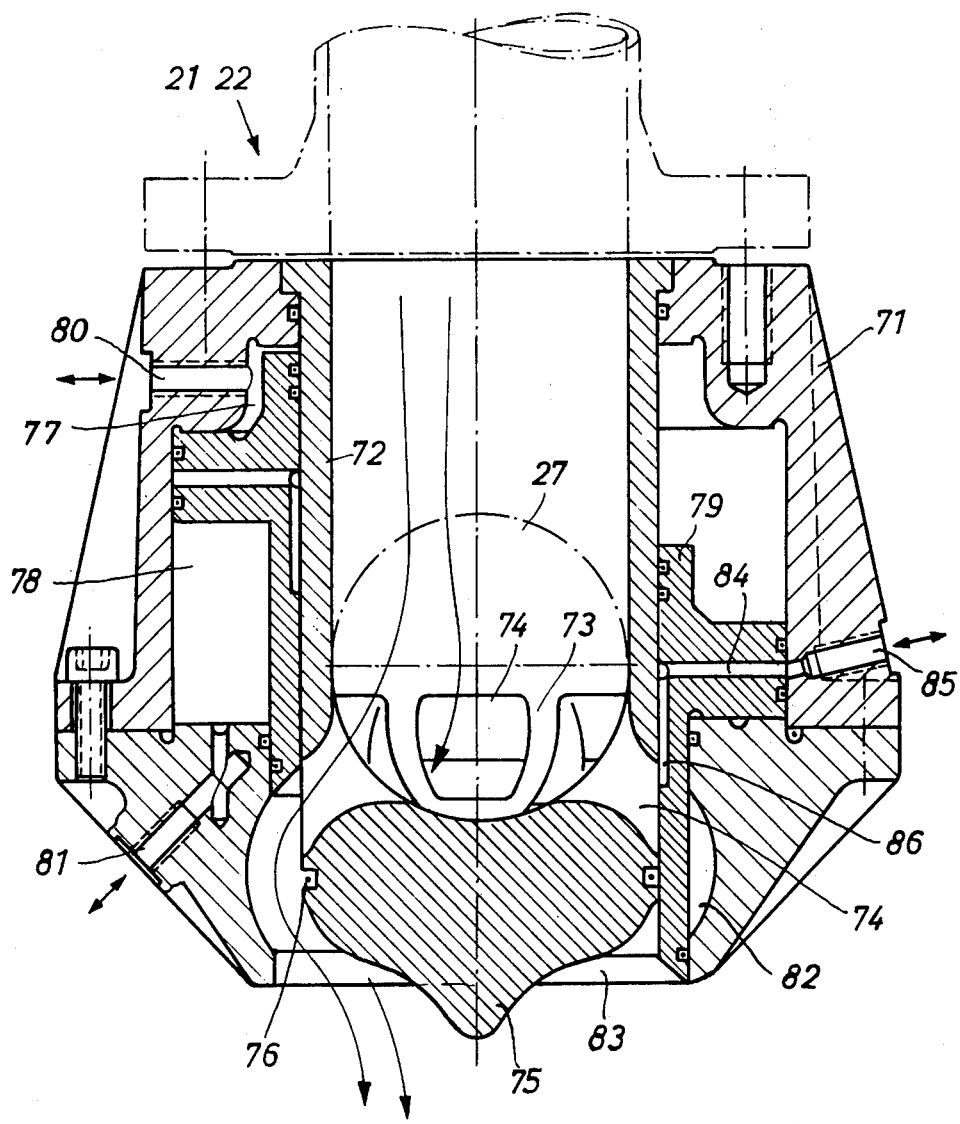
FIG. 5 illustrates a section through a filling mechanism, one half showing the closed condition and the other the open condition.

FIG. 5 illustrates in detail the filling mechanism 21 or 22. It is similar in design to the arrangement of FIG. 4, with the distinction however that the arrangement of FIG. 4 can be considered as having been half cut away in the transverse sense. It once again exhibits a housing 71 flange-connected to a pipe, inside which housing there is fixed bush 72 whose internal bore is coaxial with the pipeline and has the same diameter thereas. At the bottom end, the bush 72 merges through individual webs 73 between openings 74, into a transverse element 75 which at its extreme circumference carries a ring seal 76. As in the arrangement of FIG. 4 the housing 71 forms with the bush 72 two control chambers 77, 78 separated by a spool sleeve 79 which is sealed relatively to bush 72 and housing 79 by means of seals and can be displaced, whilst guided by the said two components, between two terminal positions one of which (open position) has been shown on the left-hand half, the other of which (closed position) at the right-hand half of FIG. 5. Through bores 80, 81 the control chambers 77, 78 can be connected to a control source in order to displace the spool sleeve 79 between the terminal positions.

The housing 71 is provided at the bottom end with an annular groove 82 in such a fashion that in the open position (left-hand half of FIG. 5) there is a through passage from the opening 74 and a passage formed between the annular groove 82 and the transverse element 75, to an opening 83. In the open position thus, fluid medium can flow out of the line for example into a tank which is to be filled. In the closed position, on the other hand, the spool sleeve is in sealing engagement through its internal wall with the annular seal 76, so that no flow can pass at al.

With the help of a ball scraper 27 indicated in broken line, the filling line can be cleansed virtually without trace, of a product which is to be discharged. The webs 73 and the transverse element 75 are once again similar to those encountered in the arrangement of FIG. 4 and are so designed that virtually wear-free interception of the ball scraper 27 is ensured.

The spool sleeve 79 has a transverse bore 84 which, in the closed position is connected at the external end with a monitoring bore 85 in the housing, whilst the other end of the transverse bore 84 communicates with an axial bore 86 which, in the closed position, communicates with one of the openings 74. In this fashion, in the closed position a facility is provided for the admission of a pressurised medium in order to return the ball scraper 27 from the position shown in FIG. 5.

Figure 6:
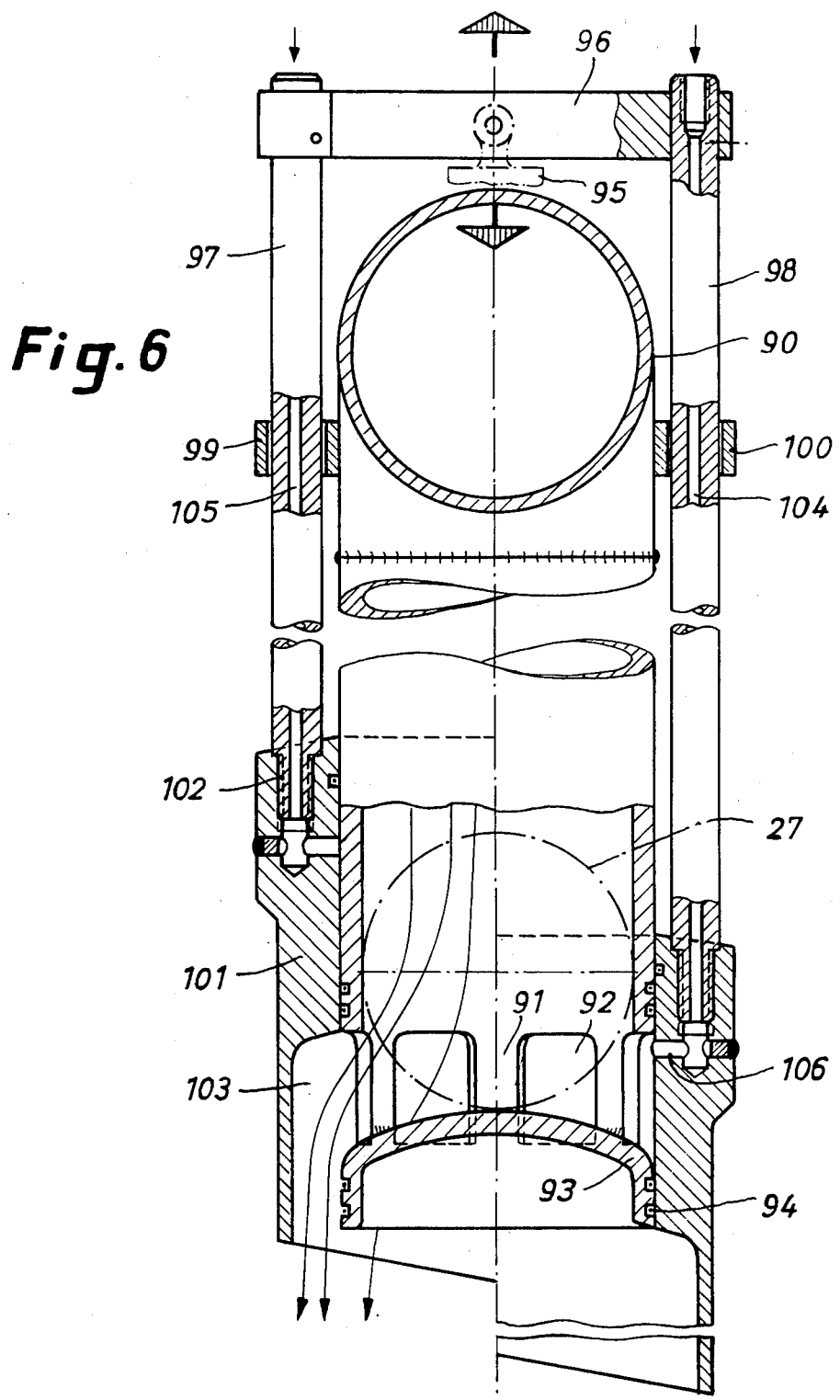
FIG. 6 illustrates a partial section through another embodiment of a filling section, where likewise one half shows the closed condition and the other the open condition.

FIG. 6 illustrates another embodiment of a filling mechanism. A filling pipe 90 is routed first of all horizontally and then vertically. At the bottom end of the filling pipe 90 individual webs 91 are provided which define between them openings 92. The webs 91 are welded to a seat element 93 having a cylindrical external surface to which two ring seals 94 are assembled. Above the horizontal section of the filling pipe 90, a servo cylinder 95 is arranged whose displaceable section is attached to a cros bar 96 fitted at both ends with adjuster rods 97, 98. The adjuster rods 97, 98 are guided in guides 99, 100 on the vertical section of the pipe 90 and are attached at the other end to a spool sleeve 101, this in fact through the medium of an attachment pin 102. By means of the servo cylinder 95, the adjuster rods 97, 98 and therefore the spool sleeve 101 can be moved between two terminal positions one of which (open position) has been shown on the left-hand side of FIG. 6 and the other (closed position) on the right-hand side of the same figure. At the bottom end, the spool sleeve is provided with an annular recess 103 which, in the open position, communicates with the openings 92 and forms passsage between the recess 103 and the ring seals 94. In the closed position, on the other hand, the ring seals 94 are in sealing engagement with the spool sleeve 93 in order to prevent the passage of fluid medium.

The actuating rods 97, 98 contain bores 104, 105 through which the controlling pressurised medium can be introduced, this being injected through a transverse bore 106 in the spool sleeve into the interior of said sleeve in order to return a ball scraper 27.

In FIG. 7, at the end of a filling line 200 there is a knukcle joint 201 which will not be described in further detail. At the other end of the knuckle joint the distributor pipe section 202 is arranged, pivotable about its axis with the help of the knuckle joint 201. The distributor pipe section 202 is curved through 90° and at the other end exhibits a connection mechanism 203, of the kind shown in more detail in FIG. 9. The connection mechanism incorporates a spool sleeve 204 which is slid over the end 205 of a filling pipeline section 206 which latter in turn leads to a filling mechanism which has not been shown. By the connection of the connection mechanism 203 to the filling line 206, a pressuretight passage for liquid or pasty media is created, which passage can at the same time be operated in conjunction with a scraper.

At the right hand side of FIG. 7, a further filling pipeline section 207 has been shown the end of which has been marked 208. The broken lines indicate that the distributor pipe section 202 can be slewed round to the filling line 207.

In FIG. 8, likewise a distributor pipe section 209 is shown which is attached through a knuckle joint 210 to a filling line which has not been shown. At the end of the pipe section 209, a connection mechanism 210 is fitted which exhibits a spool sleeve 211 which latter can arbitrarily be placed in sealing engagement with one of the eight ends 212 of the eight filling pipeline sections 213.

In the embodiment shown in FIG. 9, at the end of a filling line 214 there is a telescopic attachment 215 for a distributor pipe section 216 which is curved through 90°. At the other end of the distributor pipe section 216, there is a connection mechanism generally marked 217, shown partially in elevation and partially in section. Beneath the mechanism 217 there are two filling pipe sections 218 and 219 to be seen. The first pipe section 218 has been illustrated as curved, whilst the other, 219, is straight. The ends 220 and 221 of these pipe sections are disposed parallel to one another and have smooth exteriors. The end faces of the terminal portions 220, 221 are located in one plane. The ends 220, 211 of the pipe sections 218, 219 are supported in a plate 222 which is carried by a supporting structure 223 (not shown in detail) which also holds the telescopic attachment 215.

At the bottom end of the pipe elbow 216, a flange 224 is welded and to this, by means of screws of which only one, 226, is shown in FIG. 9, the housing 225 is attached. The housing 225 has a stepped, through bore which in the upper zone forms a shoulder 260 supporting a flange 227 belonging to a pipe section 228. Seals, not shown in detail, in the flange 227 and in the shoulder 228 effect a seal between these components. As the drawing clearly shows, the internal diameter of the pipe section 228 corresponds to that of the elbow 216 and to that of the filling pipeline 218. Also, the external diameter of the pipe section 228 is identical to that of the end 220 of the pipeline. For the rest, the pipeline end section 221 has the same dimensions as the pipeline end section 220. By the provision of a bore section of larger diameter in the housing 225, in association with the exterior of the pipeline section 228, an annular space 229 is formed in which a spool sleeve 230 is displaceably assembled. Seals, which have not been shown in detail, provide a seal at both sides of the spool sleeves 230, in relation to the associated boundary of the annular space 229.

The spool sleeve 230 is provided with an annular shoulder 231 forming distant ares which can be supplied with pressurised medium at both ends. The supply of the pressurised medium in order to displace the spool sleeve 231, has not been shown in detail. It is provided at both ends of the annular space 229 so that the spool sleeve 230 can be displaced in both directions. The spool sleeve 230 has been shown in FIG. 9 in the connecting position in which a bottom section 232 has been slid over the end 220 and is in sealing engagement with the exterior thereof. To this end, the section 232 of the spool sleeve 230 is provided with an appropriate seal (not shown). The bottom stop for the shoulder 231 of the spool sleeve 230 is formed by ring 233 flange-connected to the bottom end of the housing 228 and delimiting the annular space 229 with its internal portion.

In the illustrated position of the distributor device, the connection mechanism 217 provides a pressure-tight connection, capable of operation in conjunction with a scraper, between the filling line 214 and the filling pipe section 218. If the connection is to be broken, then the spool sleeve 230 is displaced out of the indicated position into the other terminal position (top position in the drawing), this by the application of a suitable pressure to the correspoding other side of the shoulder 231. As a consequence, the section 232 releases the end 220 of the pipeline and the mechanism 217 can be displaced, in the manner indicated by the double arrow 234, out of the indicated position, in fact, into a position above the pipe end 221 so that the pipe section 228 is aligned with the end 221 of the pipeline and the spool sleeve 230 can be traversed into the connecting position, with its section 232, in order to enable the pipeline section 219 to be supplied.

The displacement of the mechanism 217 is effected by means of the telescopic connection 215 which will be described in more detail hereinafter. An arrangement of this kind has already been disclosed in German Patent Application No. P 23 34 965.7. It can also be employed for the parts 15, 16 (FIG. 1) of the installation 13 and 14. To the end of the filling line 214 which is connected to a series of vessels or tanks containing media which are to be discharged and filled into other recipients, a flange 235 is welded. The flange 235 serves for attachment to a plate 236 by means of screws 237 only one of which has been illustrated. The plate 236 contains stepped, through bore 238 in the larger section of which a ring 239 with a flange, is fitted. Between plate 236 and ring 239, on the one hand, and the flange 235 on the other, a seal 240 is arranged. A cylindrical sleeve 242 is located in fitted, sealed fashion on a spigot 241, its end face abutting against the opposing end face of the plate 236. At a distance from the plate 236 a further plate 243 is provided which contains a through bore. The plate 243 has a spigot 245 upon which the other end of the sleeve 242 fits, the latter's end face likewise abutting against the associated end face of the plate 243. The plates 236 and 243 are loaded together by means of tie bolts 246.

A telescopic tube 247 within the sleeve 246 and disposed coaxially in relation thereto, abuts against the facing end of the pipe elbow 216. Telescopic tube 247 and pipe elbow 216 are attached together by a sleeve 248. Filling line 214, telescopic tube 247 and pipe elbow 248 have the same internal diameter. By means of a key connection 250, not descried in any more detail here, an annular piston 251 is keyed to the telescopic tube 247. A sleeve 251 of small wall thickness, is fitted into the bore of the plate 236. It also fits inside the through bore defined by annular piston 251 and telescopic tube 247, the diameter of which through bore corresponds to the smaller diameter bore in the plate 236. The left hand end of the sleeve 231 abuts against the ring 239. The sleeve reduces the diameter of the flow area by the amount of its wall thickness. The right hand end of the sleeve 251 is chamfered so that there is a smooth transition from the bore in the sleeve 251 to that of the telescopic tube 257. A smooth transition from the internal diameter of the sleeve 251 to that of the filling line 239, is effected by virtue of the continuous change in the internal diameter of the ring 239, which increases gradually from the internal diameter of the sleeve 251 to that of the filling line 214.

In the plates 236 and 243, passages 252 and 253 are machined which can be connected to pressure sources which have not been shown. The passages 252 and 253 can supply pressurised media to opposite sides of the annular piston 251. In FIG. 9, the annular piston has been shown in the left-hand terminal position. The supply of a pressurised medium through the passage 252 produces a displacement on the part of the annular piston 251 towards the right in the direction of the plate 243 so that the telescopic tube 247 and the pipe elbow 216 likewise displaced towards the right and a connection between the filling line 214 and the filling pipe section 219 can therefore be established. The supply of a pressurized medium through the passage 253 would result in the return of these components to the indicated position. Although no more detailed explanation of this will be given, the individual components of the telescopic connection are sealed in relation to one another by suitble ring seals in order to prevent escape of the medium being discharged or of the pressurised medium used for control and displacement purposes. The embodiment of FIG. 9, with a telescopic connection, has been described, in which the telescopic displacement of the connection mechanism 217 is effected using a pressurised medium. Self-evidently, the telescopic tube 247 could equally well be displaced manually or mechanically or by some other kind of drive system.

As can be seen, the telescopic connection 215 does not affect the ability of the distributor device to operate in conjunction with a scraper system, either.

In the following, once again the advantages of the individual embodiments will be described. The shut-off and regulating devices are readily amenable to operation in conjunction with a scraper system, and indeed in the case of the arrangement shown in FIG. 2 without any risk of residue running into the pipeline. The spool sleeve is fully pressure-relieved in all the arrangement and this means a corresponding freedom from wear and extremely low displacement forces. The device in accordance with the invention, due to the use of a spool sleeve makes for simple, uncomplicated and reliable direct and remote control arrangements. Furthermore, in the event of seal wear a simple check on leakage can be made. The device in accordance with the invention, furthermore, dispenses with any glands, has very small overall dimensions (the maximum diameter is not greater than the flange diameter of the particular pipelines). The installed lengths correspond to those of the shortest ball cocks available. The device in accordance with the invention, can furthermore, quickly and easily be dismantled and assembled. Using appropriate metering of the controlling pressurised medium for the spool sleeve, gentle closing and opening can be carried out so that no pressure surges occur in the product. Because of the simplicity of its construction, the device in accordance with the invention can be manufactured at the expense of small outlay. It does not oppose a very high resistance to the fluid medium. When designed as a filling mechanism it is ideal for applications in which filling takes place below the liquid level. All the mechanisms can be set to intermediate positions so that corresponding throttling of the fluid medium is possible.

What is claimed is:

1. A valved tee fitting to be mounted in a fluid line comprising, in combination, a housing having an open unobstructed primary cylindrical flow passage defined therein, means defined on said housing for attaching said housing in a fluid line wherein said flow passage is coaxial with the fluid line, said passage being defined by an annular guiding bushing axially fixed within said housing having a central region, end regions, an inner cylindrical surface and an outer cylindrical surface, said inner cylindrical surface defining the minimum diameter of said flow passage, a lateral flow passage defined in said housing transversely disposed to said primary flow passage, means defined on said housing for attaching a lateral fluid line to said housing in communication with said lateral flow passage, at least one first port defined in said bushing central region selectively communicating with and in radial alignment with said lateral flow passage, an annular chamber defined in said housing in radial alignment with said bushing having an inner cylindrical surface defined by said bushing outer surface, an annular spool sleeve axially defined by ends and defining a shut-off element axially slidably received within said chamber for movement between first and second axial positions and sealed with respect to said bushing outer surface, at least one second radial port defined in said spool radially aligning with said first port at said sleeve first position, said sleeve sealing said first port at said sleeve second position, control pressure medium ports defined on the exterior of said housing communicating with said chamber at each end of said sleeve and selectively communicating with a controlled source of fluid pressure whereby said sleeve comprises a piston selectively movable between said first and second positions by a controlled pressurized medium, sealing means on said sleeve sealing said chamber and said control pressure ports from communication with said housing flow passage, said lateral flow passage defined in said housing communicating with said second port upon alignment of said first and second ports permitting fluid flow through said housing from said primary flow passage through said lateral flow passage.

2. A valved tee fitting as claimed in claim 1 wherein said guide bushing comprises two coaxially disposed sections, said sections having facing ends spaced apart from one another, the spacing between said ends defining said first port.

3. A valved tee fitting as claimed in claim 1 in which said housing in the vicinity of said lateral flow passage in said bushing has an annular groove defined in said housing surrounding said spool sleeve and guide bushing in radial alignment with said first port and communicating with said lateral flow passage, said spool sleeve being provided with a series of openings distributed uniformly about its periphery defining a plurality of second ports.

4. A valved tee fitting as claimed in claim 1, a monitoring passage defined in said housing communicating with said second radial port and one of said control pressure medium ports when said sleeve is in said second position to permit monitoring of the effectiveness of said sealing means on said sleeve.

* * * * *